No. 661,404. Patented Nov. 6, 1900.
G. M. HUBBARD.
SASH FASTENER.
(Application filed May 26, 1900.)
(No Model.) 2 Sheets—Sheet 1.

Witnesses. George M. Hubbard.
Inventor.
By Atty's

No. 661,404. Patented Nov. 6, 1900.
G. M. HUBBARD.
SASH FASTENER.
(Application filed May 26, 1900.)
(No Model.) 2 Sheets—Sheet 2.

UNITED STATES PATENT OFFICE.

GEORGE M. HUBBARD, OF NEW HAVEN, CONNECTICUT, ASSIGNOR TO THE W. & E. T. FITCH COMPANY, OF SAME PLACE.

SASH-FASTENER.

SPECIFICATION forming part of Letters Patent No. 661,404, dated November 6, 1900.

Application filed May 26, 1900. Serial No. 18,081. (No model.)

*To all whom it may concern:*

Be it known that I, GEORGE M. HUBBARD, of New Haven, in the county of New Haven and State of Connecticut, have invented a new Improvement in Sash-Fasteners; and I do hereby declare the following, when taken in connection with the accompanying drawings and the letters of reference marked thereon, to be a full, clear, and exact description of the same, and which said drawings constitute part of this specification, and represent, in—

Figure 1:
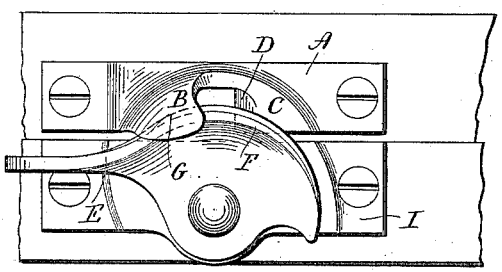
Figure 2:
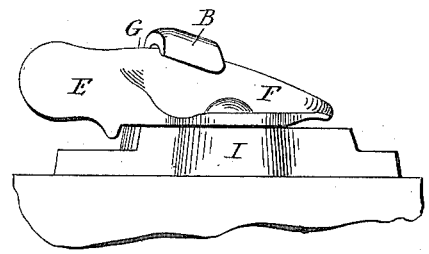
Figure 3:
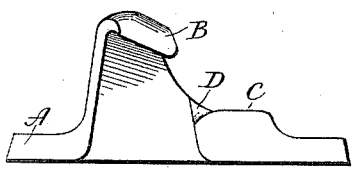
Figure 4:
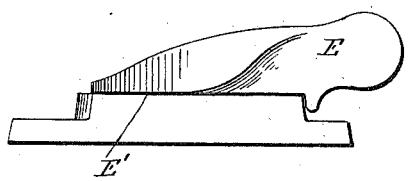
Figure 5:
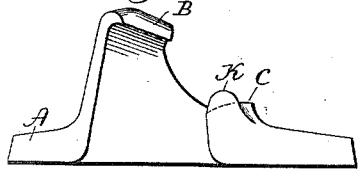
Figure 7:
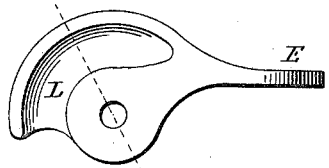
Figure 6:
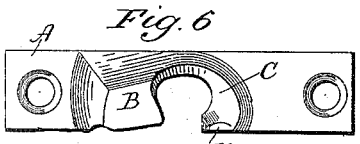
Figure 8:
Figure 9:
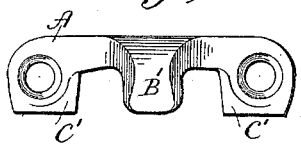
Figure 11:
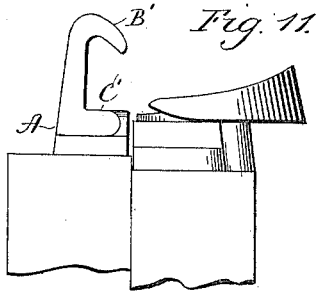
Figure 10:
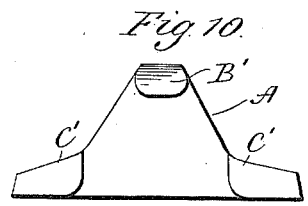
Figure 12:
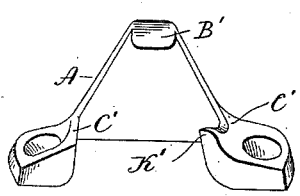
Figure 13:
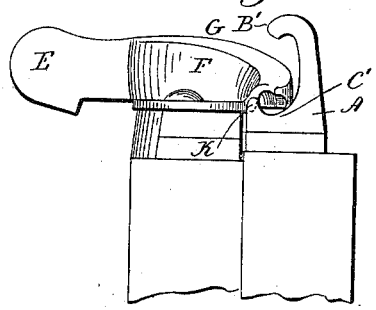
Figure 14:
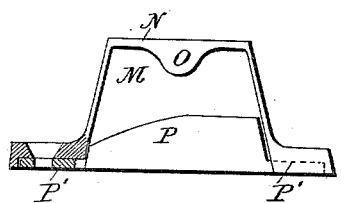
Figure 15:
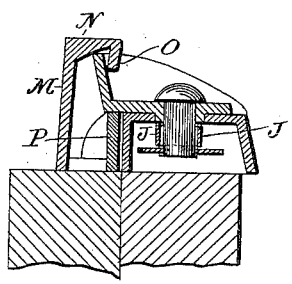
Figure 18:
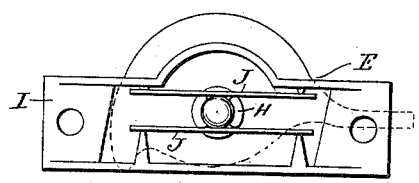
Figure 16:
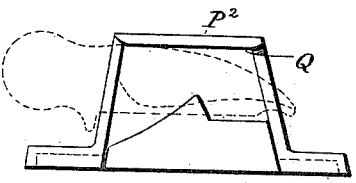
Figure 19:
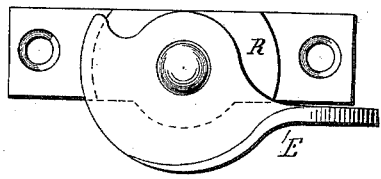
Figure 17:
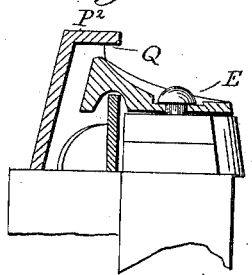
Figure 20:
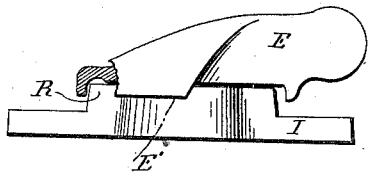
Figure 21:
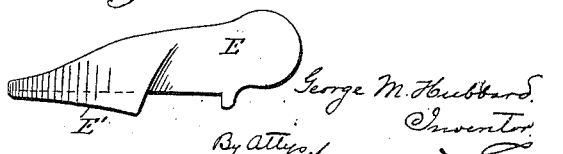

Figure 1 a top or plan view of a sash-fastener constructed in accordance with my invention; Fig. 2, a front view of the same; Fig. 3, a front view of the keeper detached; Fig. 4, a front view of the case-plate with the lever thereon, the lever being turned to its unlocked position; Fig. 5, a front view of a similar keeper having its depressing-surface formed with a locking-lug; Fig. 6, a top view of the same; Fig. 7, an under side view of a lever detached; Fig. 8, a sectional view on the line $a\ b$ of Fig. 7; Fig. 9, a top view of another modified form of keeper; Fig. 10, a front view of the same; Fig. 11, a side view of a sash-fastener in connection with a keeper like that shown in Figs. 9 and 10; Fig. 12, a front view of a keeper like that shown in Figs. 9 and 10, having its depressing-surface formed with a locking-lug; Fig. 13, a side view of such a keeper with a lever in its partially-locked position; Fig. 14, a front view, partially in section, of a keeper with an independently-formed depressing-surface; Fig. 15, a sectional view of such a keeper in connection with a sash-fastener lever and case-plate, which are also in section; Fig. 16, a front view of a keeper, similar to that shown in Fig. 14, with the drawing-finger formed on the depressing-surface instead of on the lifting edge and showing a sash-fastener lever in broken lines; Fig. 17, a sectional view of such a keeper in connection with a lever and case-plate; Fig. 18, an under side view of a case-plate, illustrating the arrangement of the lever-springs; Fig. 19, a top view of a lever and case-plate; Fig. 20, a side view, partially in section, of the same construction, which shows the flange of the lever depending below the upper edge of the case-plate; Fig. 21, a side view of another modified form of lever.

This invention relates to an improvement in sash-fasteners, and particularly to that class in which a substantially horizontally arranged lever is employed in connection with a keeper having a lifting-finger, whereby the turning of the lever into its locked position will lift the lower rail of the upper sash into line with the top rail of the lower sash and so that the rails are in position to be drawn together, an example of such a fastener being shown in United States Patent No. 564,426, granted July 21, 1896, upon my application.

It sometimes occurs that the sashes are so imperfectly fitted in the frames that the lower rail of the upper sash may be lifted above the top rail of the lower sash, in which case the lever does not properly coact with the keeper to firmly hold the sashes.

The object of this invention is to provide the keeper with a depressing-surface which will coact with the under face of the lever when the lower rail of the upper sash stands above the upper rail of the lower sash and so that the upper sash will be depressed or the lower sash raised until the keeper and lever are in position to properly coact to lock the sashes together.

As will hereinafter appear, the invention is applicable to various forms of keepers and levers; and it consists in various constructions, as will be hereinafter described, and particularly recited in the claims.

In applying my invention to a form of sash-fastener shown in the above-named patent I form the keeper A, which has a lifting and drawing finger B, with a depressing-surface C, which is in a plane below the finger B and preferably formed at its inner edge with a rounded surface D to permit the lever E, which, as herein shown, is like the keeper described in my previous patent, to ride over it, the said keeper having a lifting and winding face F, which merges into a drawing edge G and coacts with the finger B to bring the meeting-rails of the sashes into line and then draw them together. The under face of this lever or the edge E' thereof is substantially flat, so that as the lever is turned it will ride over the depressing-surface C and bring the meeting-rails of the sashes into alinement. Preferably, also, and as shown in Figs. 8 and 15, the under face of the lever will be provided with a depending hub H, which extends into a case-plate I, within which are springs J J, which coact with the hub of the lever to force the lever into its locked or unlocked position and so that under the action of the springs the meeting-rails of the sash will, when the lever is turned toward its locked position, be gradually drawn together.

Instead of depending upon the finger B to coact with the drawing edge G of the lever to draw the meeting-rails of the sashes together the end of the finger may be cut away, as shown in Fig. 5, and the depressing-surface C formed with a drawing-lug K, as shown in Figs. 5 and 6, in which case the under face of the lever will be formed with a groove L, as shown in Figs. 7 and 8, the said groove forming a flange $E^2$, the lower edge of which is preferably in the plane of the under face of the lever and so that as the lever is turned over the depressing-surface C the lug K will enter the groove L, and the edge or flange $E^2$ thereof will act upon the lug to draw the meeting-rails of the sashes together, the said finger coacting with the upper surface of the lever to lift the upper sash or depress the lower sash if there is occasion for so doing.

Instead of forming the lifting-finger at one side of the horizontal center of the keeper, as shown and described, the finger B' may be arranged in the center of the keeper, as shown in Figs. 9 and 10, and the keeper formed with a depressing-surface C' at either side of the finger. A keeper of this character will coact with a lever like that before described either with a flat or grooved under face.

Instead of forming the finger B' (shown in Figs. 9 and 10) with a drawing end this end may be cut away, as shown in Figs. 12 and 13, and at one or both sides of the keeper the depressing-surface C' formed with a locking-lug K', in which case a lever having a grooved under face will be employed the flanged edge of which will coact with this locking-lug in the manner heretofore described.

In some forms of keepers—such, for instance, as that shown in Figs. 14 and 15, which consist of a comparatively high body or back M, lifting-finger N, and drawing end O—it is inconvenient to cast or form the depressing-surface integral therewith. In such cases I form the depressing-surface P independent of the keeper and with arms P' at opposite sides, by which it is secured in position by the same screws which hold the keeper and so that the upper edge of the depressing-surface will stand below the drawing-finger, as clearly shown in Fig. 14. This depressing-surface will coact with a lever in the same manner as those heretofore described.

Instead of forming the keeper last described with the drawing end O of the finger that end may be omitted, as shown in Fig. 16, in which case the upper edge of the depressing-surface $P^2$ will be formed with a locking-lug Q, which will coact with a groove formed in the under face of the lever in the manner previously set forth.

While I prefer to form my lever with an upwardly-winding lifting-face which merges into the drawing edge, as clearly shown in Fig. 2, it is evident that the lever may be otherwise formed. Thus the lifting-face may be raised above the central portion of the lever in the form of a winding wall or edge, as shown in Fig. 13, and the upper edge of this wall may be flat or rounded, as preferred. The lower edge of the lever may be substantially flat, as indicated in Fig. 2, or its forward end may be slightly raised, as indicated in Fig. 11 and so as to more readily ride over the depressing-surface on the keeper.

In some cases it may be desirable that the flange or edge E' shall extend below the lower face of the body of the lever, in which case the central portion R of the case-plate I will have its ends rounded, as shown in Fig. 19, so that the flange of the lever will set down over the upper surface of the central portion R, as shown in Fig. 20. If desired, also, the lower edge or flange E' may be inclined, as indicated in Fig. 21, so as to practically form cam-surfaces on opposite sides of the lever.

From the foregoing it will be clearly evident that the form of the keeper may be variously modified, as well as the exact construction of the lever and the manner of mounting the lever on the case-plate, and I therefore do not wish to be understood as limiting the invention to the exact details of construction shown, as other modifications will be naturally suggested to one skilled in the art. I am aware, however, that keepers for sash-fasteners have been formed with surfaces adapted to coact with a lever to raise or depress a sash and do not therefore claim, broadly, such as my invention.

Having fully described my invention, what I claim as new, and desire to secure by Letters Patent, is—

1. In a sash-fastener, the combination with a horizontally-arranged lever mounted on a case-plate and provided with an upwardly-winding upper lifting-face and a drawing edge on its under face, of a keeper formed with a lifting-finger and with a depressing-surface in a plane below said finger and between which the lever is adapted to be turned, said depressing-surface of the keeper formed with an upwardly-extending locking-lug, which coacts with the drawing edge of the lever, substantially as described.

2. In a sash-fastener, the combination with a horizontally-arranged lever formed with a depressing lower edge, and an upwardly-winding lifting-face, of a keeper having a lifting and drawing finger and a depressing-surface in a plane below said finger and at one side thereof and between which finger and surface the lever is adapted to be turned and wedged when in the locked position, substantially as described.

3. In a sash-fastener, the combination with a horizontally-arranged lever formed in its lower edge with a cam-groove, of a keeper formed with a lifting-finger and with a depressing-surface in a plane below said finger, said depressing-surface provided with a lug adapted to coact with said groove to draw the meeting-rails of the sashes together when the lever is turned into its locked position, substantially as described.

4. In a sash-fastener, the combination with a case-plate, of a lever mounted thereon and formed with a hub extending into the case-plate, one or more springs in said case-plate, coacting with the hub of the lever to throw it into its locked or unlocked position, said lever formed with an upwardly-winding lifting-face and a depressing edge, and a keeper formed with a lifting-finger and depressing-surface between which the lever is adapted to be turned, whereby the meeting-rails of the sashes are either lifted or depressed into line with each other, substantially as described.

5. In a sash-fastener, the combination with a horizontally-arranged lever having a lifting upper face and a depressing lower face, of a keeper having a lifting-finger and a depressing-surface formed independent of the keeper but adapted to be secured thereto in a plane below said finger and in position for the lever to be passed between them, whereby the lifting and depressing surfaces of the lever may respectively engage with the lifting-finger or the depressing-surface of the keeper, substantially as described.

In testimony whereof I have signed this specification in the presence of two subscribing witnesses

GEORGE M. HUBBARD.

Witnesses:
   JOHN B. FITCH,
   FREDK. F. BREWSTER.